(12) United States Patent
Sano et al.

(10) Patent No.: US 8,817,268 B2
(45) Date of Patent: Aug. 26, 2014

(54) OPTICAL FILTER, OPTICAL FILTER MODULE, AND PHOTOMETRIC ANALYZER

(75) Inventors: Akira Sano, Shiojiri (JP); Yasushi Matsuno, Matsumoto (JP)

(73) Assignee: Seiko Epson Corporation (JP)

( * ) Notice: Subject to any disclaimer, the term of this patent is extended or adjusted under 35 U.S.C. 154(b) by 120 days.

(21) Appl. No.: 13/479,931

(22) Filed: May 24, 2012

(65) Prior Publication Data

US 2012/0300208 A1  Nov. 29, 2012

(30) Foreign Application Priority Data

May 25, 2011  (JP) ................. 2011-116643

(51) Int. Cl.
*G01J 3/45* (2006.01)
*G01B 11/02* (2006.01)
*G02B 27/00* (2006.01)

(52) U.S. Cl.
USPC ............ 356/454; 356/506; 356/516; 359/578

(58) Field of Classification Search
USPC .......... 356/452, 454, 456, 506, 519; 359/578, 359/585
See application file for complete search history.

(56) References Cited

U.S. PATENT DOCUMENTS 5,982,546 A * 11/1999 Kawamoto et al. ........... 359/584
7,034,981 B2    4/2006 Makigaki 2007/0242920 A1 * 10/2007 Lin et al. ................... 385/27
2009/0231396 A1 *  9/2009 Yazaki ........................ 347/71
2010/0022840 A1 *  1/2010 Yasuda ..................... 600/160
2010/0302660 A1 * 12/2010 Hirokubo et al. ........... 359/850

FOREIGN PATENT DOCUMENTS

| JP | 01-300202 | 12/1989 | |
| JP | 02205818 A * | 8/1990 | ............. G02F 1/133 |
| JP | 2004-219843 | 8/2004 | |
| JP | 2005-223111 | 8/2005 | |
| JP | 2011-008225 | 1/2011 | |

* cited by examiner

*Primary Examiner* — Gregory J Toatley
*Assistant Examiner* — Dominic J Bologna
(74) *Attorney, Agent, or Firm* — Harness, Dickey & Pierce, P.L.C.

(57) ABSTRACT

An optical filter includes fixed substrate, a movable substrate opposed to the fixed substrate, a first reflection film provided on a surface of the fixed substrate facing the movable substrate, a second reflection film provided on the movable substrate and opposed to the first reflection film across a gap, a first electrode formed to cover the first reflection film and to extend beyond an outer circumference of the first reflection film, and a second electrode provided on a surface of the movable substrate facing the fixed substrate and opposed to a part of the first electrode, and the first electrode is formed of a light-transmissive material, and the first electrode and the second reflection film are electrically connected at the same potential.

12 Claims, 11 Drawing Sheets

OPTICAL FILTER, OPTICAL FILTER MODULE, AND PHOTOMETRIC ANALYZER

BACKGROUND

1. Technical Field

The present invention relates to an optical filter, an optical filter module, and a photometric analyzer.

2. Related Art

A known optical filter extracts light having a specific wavelength from light having plural wavelengths. An example of such an optical filter is a tunable interference filter.

A tunable interference filter is an optical filter in which reflection films (optical films) formed on substrates oppose one another and a gap dimension between the reflection films is changed by an external force to transmit light having a wavelength corresponding to the gap dimension.

JP-A-1-300202 (see FIG. 1(b)), discloses a configuration in which a titanium oxide thin film layer, a silver thin film layer, and a protective film are sequentially stacked as a reflection film on a substrate. The protective film is provided for preventing deterioration due to sulfuration and humidity of the silver thin film layer because of exposure to the air for a long period.

However, the protective film according to JP-A-1-300202 is formed using an insulating material, and there is a problem that a charge is accumulated on the surface of the insulating material and the reflection film thus becomes charged.

Accordingly, in the tunable interference filter in which the reflection films are oppositely provided, a repulsive force or an attractive force is generated between the reflection films due to the charging of the reflection films. This causes a reduction in the accuracy of controlling the distance between the reflection films.

SUMMARY

An advantage of some aspects of the invention is to solve at least a part of the problems described above, and the invention can be implemented in the following forms or application examples.

Application Example 1

This application example is directed to an optical filter including a first substrate, a second substrate opposed to the first substrate, a first reflection film provided on a surface of the first substrate facing the second substrate, a second reflection film provided on the second substrate and opposed to the first reflection film across a gap, a first electrode formed to cover the first reflection film and to extend beyond an outer circumference of the first reflection film in a plan view of the first substrate as seen from a thickness direction, and a second electrode provided on a surface of the second substrate facing the first substrate and opposed to a part of the first electrode, wherein the first electrode is formed of a light-transmissive material, and the first electrode and the second reflection film are electrically connected.

According to the configuration, the first electrode is formed to cover the first reflection film, and the first electrode and the second reflection film are electrically connected. Accordingly, the first electrode and the second reflection film are at the same potential, and no charge is accumulated on the surfaces of the opposed first electrode and second reflection film, and charging on both surfaces may be prevented. Thus, an extra force such as a repulsive force or an attractive force does not act between the first reflection film and the second reflection film and a reduction in the accuracy of controlling the distance between reflection films due to charging may be suppressed.

Application Example 2

In the optical filter according to the above application example, it is desirable that a distance between the second electrode and the first electrode opposed to the second electrode is larger than a distance between the first reflection film and the second reflection film.

When a voltage is applied between the first electrode and the second electrode and the gap dimension between the first electrode and the second electrode becomes minute, a pull-in phenomenon that a pulling force sharply increases between them occurs. According to the configuration, the pull-in phenomenon may be suppressed because the distance between the first electrode and the second electrode is larger than the distance between the first reflection film and the second reflection film.

Accordingly, the first reflection film and the second reflection film do not contact or stick to each other, and the gap between the reflection films may be maintained.

Application Example 3

In the optical filter according to the above application example, it is desirable that a first reflection film formation part of the first substrate in which the first reflection film is formed is provided in a location at a smaller distance from the first substrate than that of a first electrode formation part opposed to the second electrode in which the first electrode is formed, and the first reflection film formation part and the first electrode formation part are connected via a slope.

According to the configuration, the first reflection film formation part in which the first reflection film is formed and the first electrode formation part are connected via the slope. That is, no step is formed between the first reflection film formation part and the first electrode formation part. Accordingly, the first electrode may be continuously formed and disconnection of the electrode may be prevented.

Application Example 4

In the optical filter according to the above application example, it is desirable that a conducting film of a light-transmissive material is formed on the surface of the second reflection film.

According to the configuration, the conducting film is formed on the surface of the second reflection film, and thus, the surface of the conducting film is not charged and no charge is generated at the side of the second reflection film. Accordingly, no attractive force or repulsive force acts between the reflection films, and the gap dimension between reflection films may be accurately controlled by applying a voltage between the first electrode and the second electrode. Further, the conducting film may protect the second reflection film.

Application Example 5

In the optical filter according to the above application example, it is desirable that an insulating film of a light-transmissive material is formed on the surface of the second reflection film and the first electrode is grounded.

According to the configuration, even when the insulating film is charged, the influence of the charged insulating film is reduced because the first electrode and the second reflection film are grounded.

Further, the insulating film is formed on the surface of the second reflection film, and the insulating film may protect the second reflection film.

Application Example 6

This application example is directed to an optical filter module including a first substrate, a second substrate opposed to the first substrate, a first reflection film provided on a surface of the first substrate facing the second substrate, a second reflection film provided on the second substrate and opposed to the first reflection film across a gap, a first electrode formed to cover the first reflection film and to extend beyond an outer circumference of the first reflection film in a plan view of the first substrate as seen from a thickness direction, a second electrode provided on a surface of the second substrate facing the first substrate and opposed to a part of the first electrode, and a light receiving unit that receives light transmitted through the first reflection film or the second reflection film, wherein the first electrode is formed of a light-transmissive material and the first electrode, and the second reflection film are electrically connected.

According to the configuration, the first electrode is formed to cover the first reflection film, and the first electrode and the second reflection film are electrically connected. Accordingly, the first electrode and the second reflection film are at the same potential, and no charge is accumulated on the surfaces of the opposed first electrode and second reflection film, and charging on both surfaces may be prevented. Thus, an extra force such as a repulsive force or an attractive force does not act between the first reflection film and the second reflection film, and a reduction in the accuracy of controlling the distance between reflection films due to charging may be suppressed, and an optical filter module that performs measurement of the amount of light with high accuracy may be obtained.

Application Example 7

This application example is directed to a photometric analyzer including a first substrate, a second substrate opposed to the first substrate, a first reflection film provided on a surface of the first substrate facing the second substrate, a second reflection film provided on the second substrate and opposed to the first reflection film across a gap, a first electrode formed to cover the first reflection film and to extend beyond an outer circumference of the first reflection film in a plan view of the first substrate as seen from a thickness direction, a second electrode provided on a surface of the second substrate facing the first substrate and opposed to a part of the first electrode, a light receiving unit that receives light transmitted through the first reflection film or the second reflection film, and an analytical processing unit that analyzes the optical properties of the light based on the light received by the light receiving unit, wherein the first electrode is formed of a light-transmissive material and the first electrode and the second reflection film are electrically connected.

According to the configuration, the first electrode is formed to cover the first reflection film, and the first electrode and the second reflection film are electrically connected. Accordingly, the first electrode and the second reflection film are at the same potential, and no charge is accumulated on the surfaces of the opposed first electrode and second reflection film, and charging on both surfaces may be prevented. Thus, an extra force such as a repulsive force or an attractive force does not act between the first reflection film and the second reflection film, and a reduction in the accuracy of controlling the distance between reflection films due to charging may be suppressed and the amount of light may be measured with high accuracy. Further, by performing photometric analysis processing based on the measurement result, accurate spectroscopic characteristics may be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments implementing the invention will be explained with reference to the drawings. Note that, in the respective drawings used for the following explanation, aspect ratios of the respective members are appropriately changed to recognizable sizes.

First Embodiment

Below, the first embodiment according to the invention will be explained with reference to the drawings.

Schematic Configuration of Colorimetric Instrument

Figure 1:
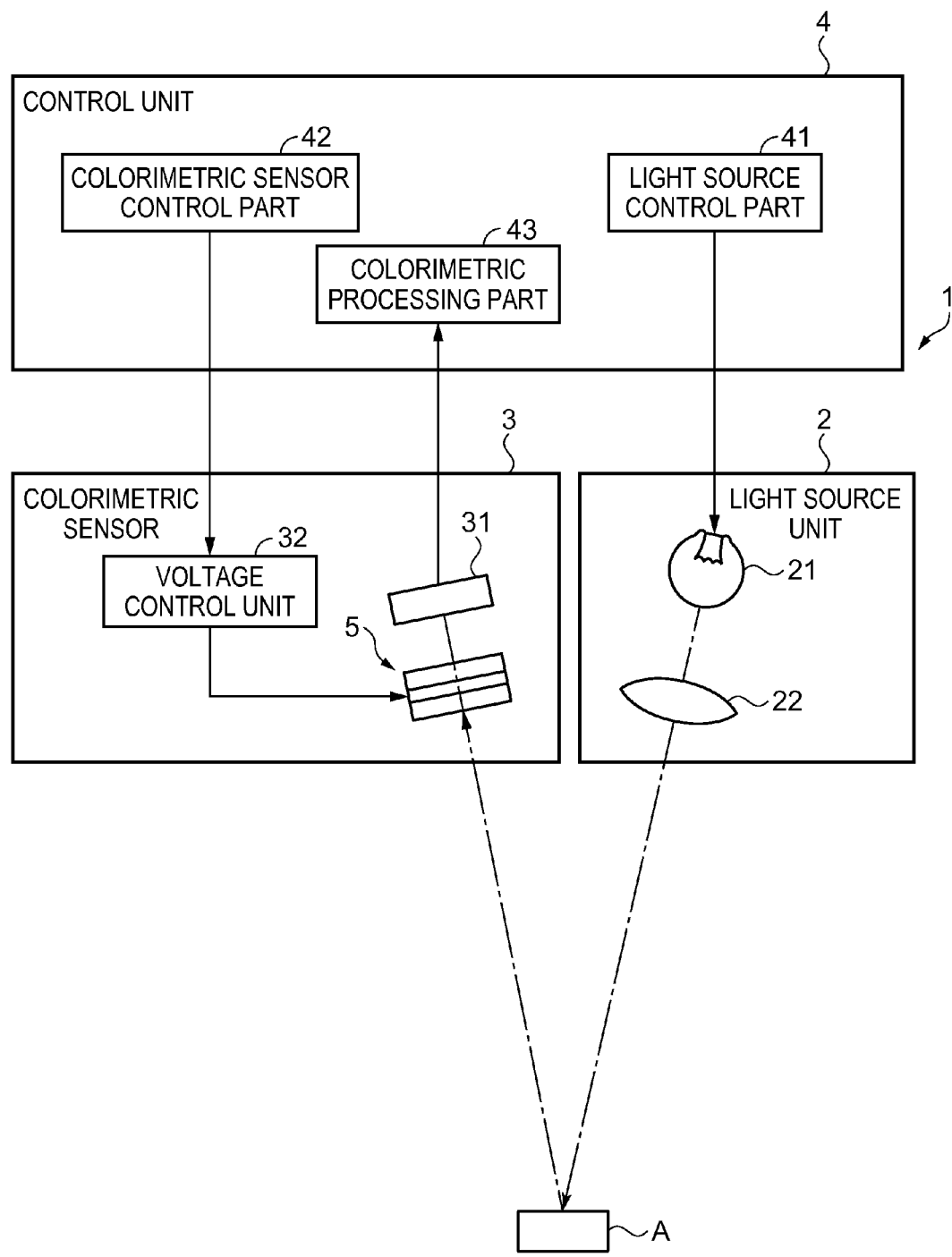
FIG. 1 is a block diagram showing a configuration of a colorimetric instrument of the first embodiment.

FIG. 1 is a block diagram showing a configuration of a colorimetric instrument as a photometric analyzer.

The colorimetric instrument 1 includes a light source unit 2 that applies light to a test object A, a colorimetric sensor 3 (optical filter module), and a control unit 4 that controls the operation of the colorimetric instrument 1.

The colorimetric instrument 1 is a device that applies light to the test object A from the light source unit 2, receives the test object light reflected from the test object A in the colorimetric sensor 3, and analyzes and measures the chromaticity of the test object light based on the detection signal output from the colorimetric sensor 3.

Configuration of Light Source Unit

The light source unit 2 includes a light source 21 and plural lenses 22 (only one is shown in FIG. 1), and outputs white light to the test object A. Further, the plural lenses 22 may include a collimator lens, and, in this case, the light source unit 2 brings the light output from the light source 21 into parallel light by the collimator lens and outputs it from a projection lens (not shown) toward the test object A.

Note that, in the embodiment, the colorimetric instrument 1 including the light source unit 2 is exemplified, however, for example, in the case where the test object A is a light emitting member, a colorimetric instrument may be formed without the light source unit 2.

Configuration of Colorimetric Sensor

The colorimetric sensor 3 as an optical filter module includes an etalon (tunable interference filter) 5, a voltage control unit 32 that controls the voltage applied to an electrostatic actuator and varies the wavelength of the light to be transmitted through the etalon 5, and a light receiving unit 31 that receives the light transmitted through the etalon 5.

Further, the colorimetric sensor 3 includes an optical lens (not shown) that guides the reflected light (test object light) reflected from the test object A to the etalon 5. Furthermore, the colorimetric sensor 3 spectroscopically separates the test object light entering the optical lens into light in a predetermined wavelength range by the etalon 5, and the spectroscopically separated light is received in the light receiving unit 31.

The light receiving unit 31 includes a photoelectric conversion element such as a photodiode and generates an electric signal in response to the amount of received light. Further, the light receiving unit 31 is connected to the control unit 4, and outputs the generated electric signal as a light reception signal to the control unit 4.

Configuration of Etalon

Figure 2:
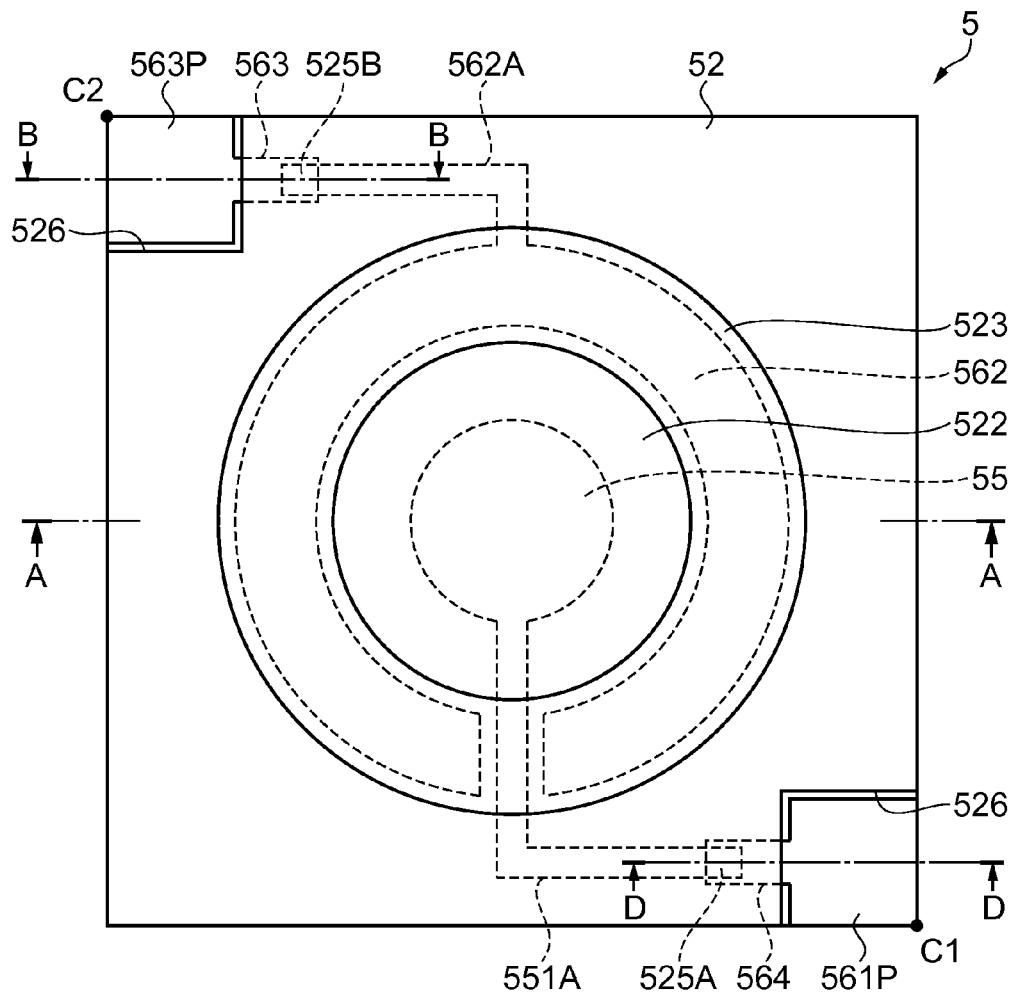
FIG. 2 is a plan view of an etalon in the first embodiment.
Figure 3:
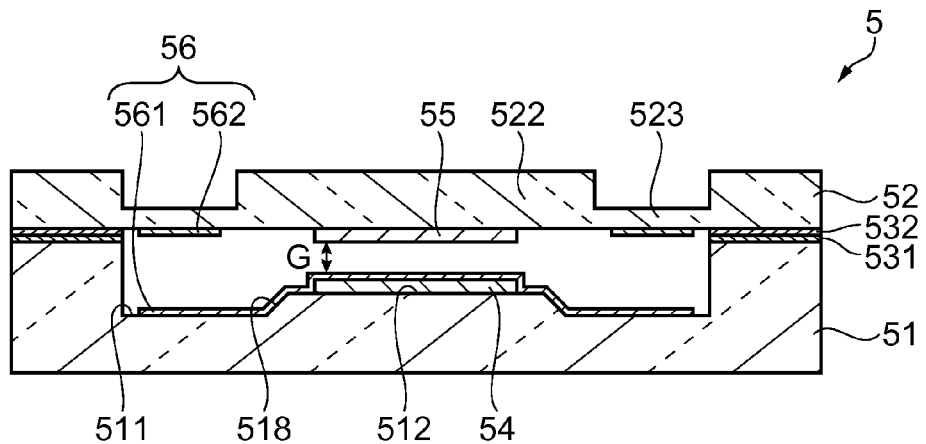
FIG. 3 is a sectional view of the etalon in the first embodiment.

FIG. 2 is a plan view of the etalon, and FIG. 3 is a sectional view along A-A section in FIG. 2.

As shown in FIG. 2, the etalon 5 as an optical filter is a plate-like optical member having a square shape in plan view, and one side is formed to about 10 mm, for example. The etalon 5 includes a fixed substrate (first substrate) 51 and a movable substrate (second substrate) 52 as shown in FIG. 3.

These substrates 51, 52 are respectively formed using base materials of various kinds of glass such as soda glass, crystalline glass, quartz glass, lead glass, potassium glass, borosilicate glass, alkali-free glass, etc. or quartz by etching of plate-like base materials.

Further, the etalon 5 is integrally formed by bonding a first bonding film 531 formed on a bonding surface of the fixed substrate 51 and a second bonding film 532 formed on a bonding surface of the movable substrate 52.

Note that, as the first and second bonding films 531, 532, plasma-polymerized films using polyorganosiloxane are preferred.

A first reflection film 54 and a second reflection film 55 having reflection characteristics and transmission characteristics of light are provided between the fixed substrate 51 and the movable substrate 52. Here, the first reflection film 54 is fixed to the surface of the fixed substrate 51 facing the movable substrate 52, and the second reflection film 55 is fixed to the surface of the movable substrate 52 facing the fixed substrate 51. Further, the first reflection film 54 and the second reflection film 55 are oppositely provided across a gap dimension G.

Further, an electrostatic actuator 56 is provided between the first reflection film 54 and the second reflection film 55 between the fixed substrate 51 and the movable substrate 52 for adjustment of the gap dimension G.

The electrostatic actuator 56 includes a first electrode 561 provided on the fixed substrate 51 and a second electrode 562 provided on the movable substrate 52.

The first electrode 561 covers the first reflection film 54 and is formed to extend beyond the outer sides of the first reflection film 54, and parts in which the first electrode 561 and the second electrode 562 are opposed to each other function as the electrostatic actuator 56.

Note that, in the etalon 5, the distance between the first electrode 561 and the second electrode 562 is formed larger than the distance between the first reflection film 54 and the second reflection film 55. For example, in the initial state in which no voltage is applied between the first electrode 561 and the second electrode 562, the distance between the first electrode 561 and the second electrode 562 is set to 2 µm and the distance between the first reflection film 54 and the second reflection film 55 (gap dimension) is set to 0.5 µm. Accordingly, the configuration may suppress a pull-in phenomenon wherein a pulling force sharply increases when the gap dimension G between the first electrode 561 and the second electrode 562 becomes minute.

Further, although the electrode covering the reflection film is provided at the fixed substrate side in the embodiment, the electrode configuration may be inversed and the electrode covering the reflection film may be provided at the movable substrate side.

Next, configurations of the fixed substrate 51 and the movable substrate 52 will be explained in detail.

Configuration of Fixed Substrate

Figure 4:
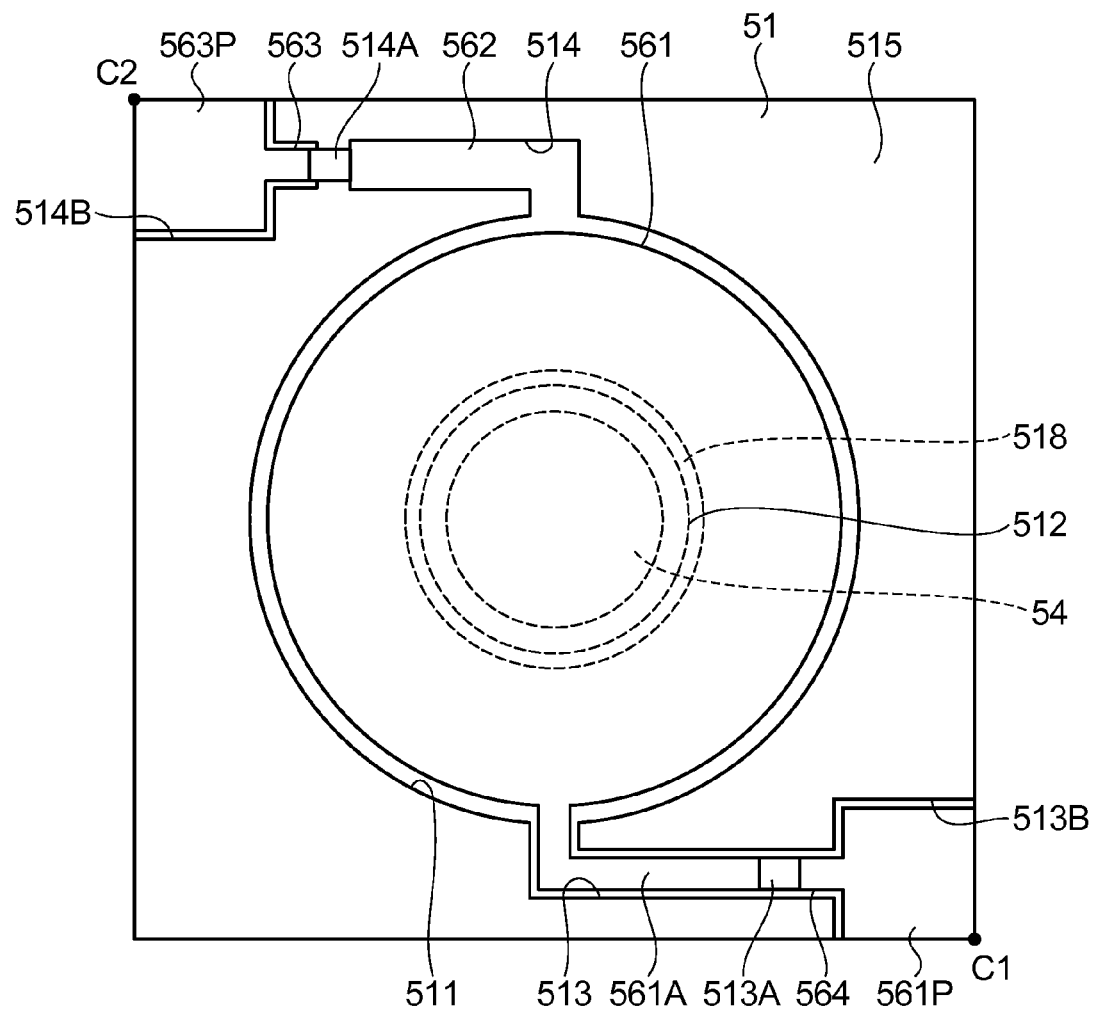
FIG. 4 is a plan view showing a configuration of a fixed substrate in the first embodiment.

FIG. 4 shows a configuration of the fixed substrate and is a plan view of the surface facing the movable substrate.

The fixed substrate 51 is formed by etching a quartz glass base material having a thickness of 500 µm, for example. In the fixed substrate 51, a circular concave part around the center of the fixed substrate 51 is provided by etching, and a first electrode formation part 511 and a reflection film formation part 512 are formed.

The first electrode formation part 511 is etched deeper than the reflection film formation part 512, and the cylindrical reflection film formation part 512 projects and the first electrode formation part 511 is concentrically formed around it.

Further, a slope 518 is formed at the boundary between the first electrode formation part 511 and the reflection film formation part 512 to form a continuous shape with no step (see FIG. 3).

In the reflection film formation part 512, the first reflection film 54 having a circular shape is formed. The first reflection film 54 is formed with a thickness of about 100 nm using a metal film of an AgC alloy or the like. Note that the first reflection film 54 may have a configuration in which another Ag alloy than the AgC alloy is used or an AgC alloy or an Ag alloy is stacked on a dielectric film of $TiO_2$ or the like.

Further, the first electrode 561 is formed to cover the first reflection film 54 and expand beyond the outer circumference edge of the first reflection film 54 to the first electrode formation part 511. The first electrode 561 is a light-transmissive conducting film, and, for example, an ITO (Indium Tin Oxide) film may be used. The thickness of the first electrode 561 is about 50 nm. The first electrode 561 is formed to cover the first reflection film 54, and thus, deterioration of the first electrode 561 due to the influence of humidity, oxidation, sulfuration, or the like may be prevented.

Furthermore, a first lead electrode part 513 extending from the outer circumferential edge of the first electrode formation part 511 toward one apex C1 of the fixed substrate 51 and a second lead electrode part 514 extending toward the apex C2 at an opposite angle of the apex C1 are provided on the fixed substrate 51.

The first lead electrode part 513 and the second lead electrode part 514 are grooves formed to the same depth as that of the first electrode formation part 511 by etching and a lead electrode 561A connected to the first electrode 561 is formed in the first lead electrode part 513.

In the end direction of the first lead electrode part 513, a projection part 513A projecting in the thickness direction of the fixed substrate 51 and a pad part 513B located in a corner of the fixed substrate 51 are provided. A conducting film connected to the lead electrode 561A is formed in the projection part 513A and the pad part 513B. Specifically, a Cr/Au film (a multilayer film with a Cr film formed as the under layer and an Au film is formed thereon) is continuously formed from the lead electrode 561A to the pad part 513B for electric connection to the outside.

The lead electrode 561A is connected to a conducting electrode 564 and the conducting electrode 564 is connected to an electrode pad 561P. As described above, conduction to the first electrode 561 can be made via the electrode pad 561P.

In the end direction of the second lead electrode part 514, a projection part 514A projecting in the thickness direction of the fixed substrate 51 and a pad part 514B continuous to the projection part 514A are provided.

A conducting film is formed in the projection part 514A and the pad part 514B. As the conducting film, a Cr/Au film is formed from the lead electrode 561A to the pad part 513B, and an electrode pad 563P for electric connection to the outside is formed in the pad part 514B.

Further, in the fixed substrate 51, parts other than the parts in which the first electrode formation part 511, the reflection film formation part 512, the first lead electrode part 513, the second lead electrode part 514, and the pad parts 513B, 514B are formed serve as a bonding surface 515 of the fixed substrate 51.

On the bonding surface 515, the first bonding film 531 preferably using polyorganosiloxane as a chief material is provided. The first bonding film 531 may be a plasma-polymerized film formed by CVD (Chemical Vapor Deposition) or the like.

Note that the upper surfaces of the above described projection parts 513A, 514A are formed to be at the same height as that of the bonding surface 515.

Configuration of Movable Substrate

Figure 5:
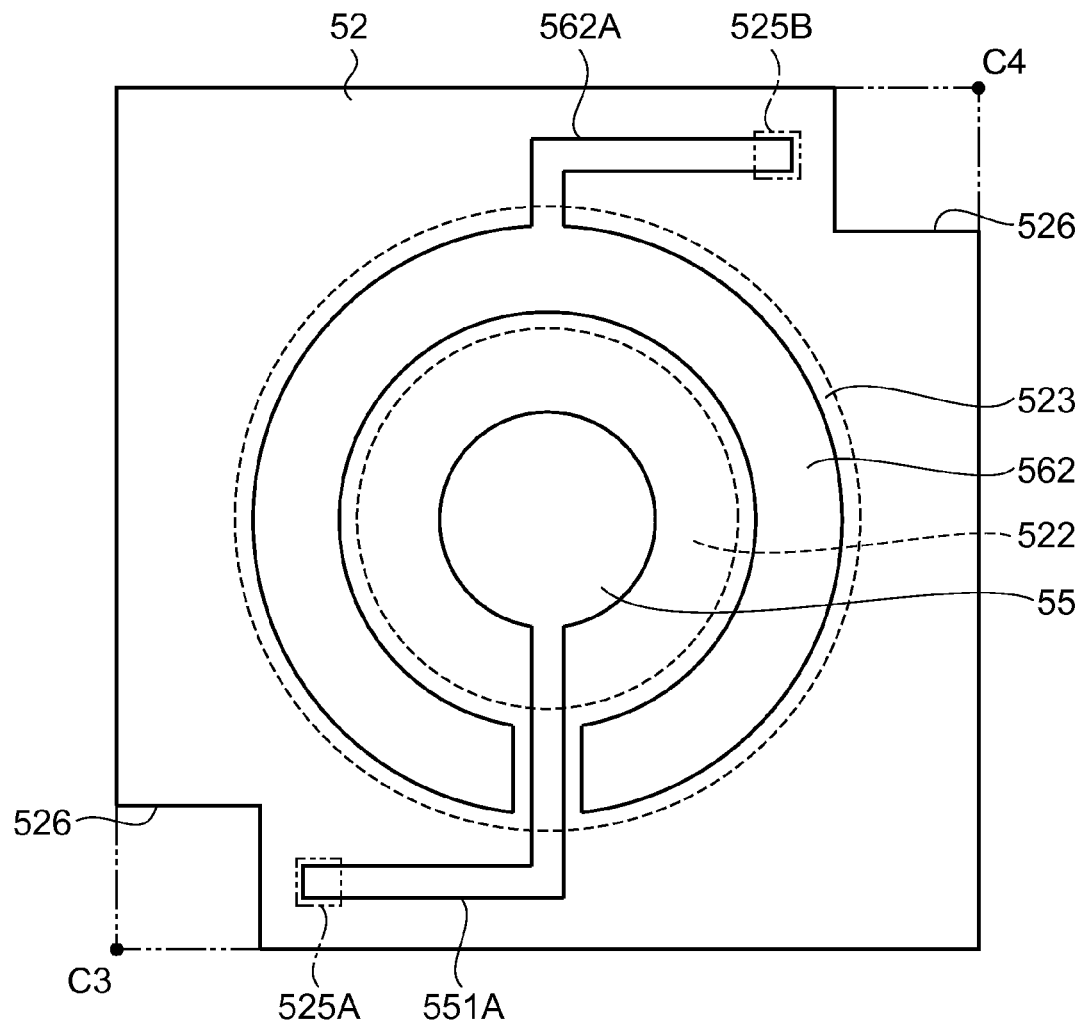
FIG. 5 is a plan view showing a configuration of a movable substrate in the first embodiment.

FIG. 5 shows a configuration of the movable substrate and is a plan view of the surface facing the fixed substrate.

The movable substrate 52 is formed by processing one surface of a glass base material having a thickness of 200 μm, for example, by etching.

Cutout parts 526 are formed in two opposing corners of the four corners of the movable substrate 52. The cutout parts 526 are formed in locations corresponding to the electrode pads 561P, 563P of the fixed substrate 51.

In the movable substrate 52, a movable part 522 having a cylindrical shape around the substrate center and a connection holding part 523 coaxially holding the movable part 522 on the periphery are formed.

In the connection holding part 523, an annular groove is formed on the opposite surface relative to the surface facing the fixed substrate 51 to be thinner than the thickness of the movable part 522 (see FIGS. 2 and 3).

As described above, the movable substrate 52 has a diaphragm structure and is arranged so that the movable part 522 may easily move in the thickness direction of the movable substrate 52.

For the surface of the movable substrate 52 facing the fixed substrate 51, a flat surface of the base material is used without an etched surface. Further, the second reflection film 55 is provided in the center part of the movable substrate 52 and the second electrode 562 formed in the connection holding part 523 to surround the second reflection film 55 is provided. Note that the second electrode 562 may be provided in the movable part 522.

An AgC alloy is preferably used as the material of the second reflection film 55, however, the film may have a configuration in which another Ag alloy than the AgC alloy is used or an AgC alloy or an Ag alloy is stacked on a dielectric film of $TiO_2$ or the like. Note that the second reflection film 55 is formed with a thickness of about 100 nm.

Further, a lead electrode 551A is formed to extend from the second reflection film 55 toward one virtual apex C3 of the movable substrate 52 and stop before the cutout part 526. The lead electrode 551A is formed of an ITO film. Note that a metal film such as a Cr/Au film may be used for the lead electrode 551A.

The second electrode 562 is formed in a C-shape with a part cut out for securing a path for the lead electrode 551A led out from the second reflection film 55. The second electrode 562 is formed of an ITO film and has a thickness of about 100 nm.

Furthermore, a lead electrode 562A extending from the second electrode 562 toward one virtual apex C4 of the movable substrate 52 is formed to stop before the cutout part 526. The lead electrode 562A is formed of an ITO film like the second electrode 562.

The end parts of the lead electrodes 551A, 562A are connection parts 525A, 525B in contact with the projection parts 513A, 514A of the fixed substrate 51.

Further, the part in the fixed substrate 51 facing the bonding surface 515 serves as a bonding surface of the movable substrate 52.

On the bonding surface, the first bonding film 531 preferably using polyorganosiloxane as a chief material is provided. The first bonding film 531 may be a plasma-polymerized film formed by CVD or the like.

Next, connection structures of the lead electrodes in the fixed substrate 51 and the movable substrate 52 will be explained in detail.

Structures of Connection Parts

Figure 6:
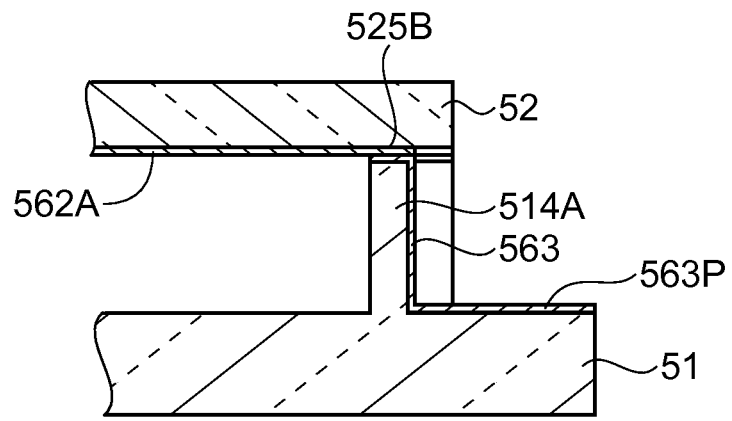
FIG. 6 is a sectional view showing a connection part in the first embodiment.

FIG. 6 is a sectional view along B-B section in FIG. 2.

In the state in which the fixed substrate 51 and the movable substrate 52 are bonded, the lead electrode 562A led out from the second electrode 562 of the movable substrate 52 contacts the projection part 514A of the fixed substrate 51 in the connection part 525B. In the projection part 514A, a conducting electrode 563 is provided to connect to the electrode pad 563P from the upper surface, and the lead electrode 562A and the conducting electrode 563 are connected on the upper surface of the projection part 514A. Accordingly, the second electrode 562 of the movable substrate 52 and the electrode pad 563P of the fixed substrate 51 are electrically connected.

Figure 7:
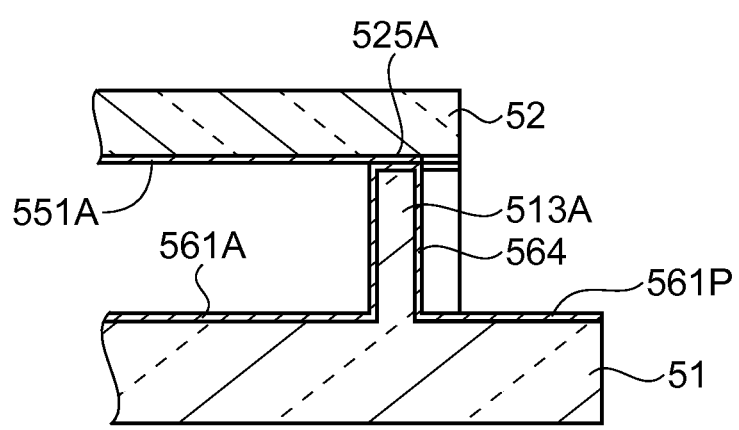
FIG. 7 is a sectional view showing a connection part in the first embodiment.

FIG. 7 is a sectional view along D-D section in FIG. 2.

In the state in which the fixed substrate 51 and the movable substrate 52 are bonded, the lead electrode 551A led out from the second reflection film 55 of the movable substrate 52 contacts the projection part 513A of the fixed substrate 51 in the connection part 525A. In the projection part 513A, a conducting electrode 564 is provided to connect to the electrode pad 561P from the upper surface, and the lead electrode 551A and the conducting electrode 564 are connected on the upper surface of the projection part 513A. Further, the conducting electrode 564 is connected to the lead electrode 561A led out from the first electrode 561. Accordingly, the second reflection film 55 of the movable substrate 52 and the first electrode 561 of the fixed substrate 51 are electrically connected via the electrode pad 563P, and the first electrode 561 and the second reflection film 55 are at the same potential.

Note that, in the embodiment, in the wiring within the etalon 5, the first electrode 561 and the second reflection film 55 are at the same potential, however, the first electrode 561 and the second reflection film 55 may be connected in an external circuit connected to the etalon 5 so that they are at the same potential.

Connection of Etalon and Voltage Control Unit

Returning to FIGS. 1 to 3, the voltage control unit 32 controls the voltage applied to the first electrode 561 and the second electrode 562 of the electrostatic actuator 56 based on the control signal input from the control unit 4.

In the connection between the above described etalon 5 and the voltage control unit 32, conducting wires connected to the voltage control unit 32 are respectively connected to the two electrode pad 561P and electrode pad 563P.

Here, in the movable substrate 52 of the etalon 5, the cutout parts 526 cut out in the locations facing the electrode pad 561P and the electrode pad 563P are formed. Accordingly, the electrode pad 561P and the electrode pad 563P are exposed for easy connection.

Configuration of Control Unit

The control unit 4 controls the operation of the colorimetric instrument 1. As the control unit 4, for example, a general-purpose personal computer, a portable information terminal, and additionally, a colorimetry-dedicated computer or the like may be used.

Further, the control unit 4 includes a light source control part 41, a colorimetric sensor control part 42, and a colorimetric processing part (analytical processing unit) 43 as shown in FIG. 1.

The light source control part 41 is connected to the light source unit 2. Further, the light source control part 41 outputs a predetermined control signal to the light source unit 2 based on the setting input by a user, for example, and allows the light source unit 2 to output white light with predetermined brightness.

The colorimetric sensor control part 42 is connected to the colorimetric sensor 3. Further, the colorimetric sensor control part 42 sets the wavelength of light to be received by the colorimetric sensor 3 based on the setting input by the user, for example, and outputs a control signal for detection of the amount of received light having the wavelength to the colorimetric sensor 3. Thereby, the voltage control unit 32 of the colorimetric sensor 3 sets the voltage applied to the electrostatic actuator 56 so that the wavelength of the light desired by the user may be transmitted based on the control signal.

The colorimetric processing part 43 controls the colorimetric sensor control part 42 to vary the gap dimension between reflection films of the etalon 5 and change the wavelength of the light to be transmitted through the etalon 5. Further, the colorimetric processing part 43 acquires the amount of light transmitted through the etalon 5 based on the light reception signal input from the light receiving unit 31. Furthermore, the colorimetric processing part 43 calculates the chromaticity of the light reflected from the test object A based on the amount of received light having the respective wavelengths obtained in the above described manner.

Advantages of First Embodiment

According to the embodiment, there are at least the following advantages.

In the etalon 5 as an optical filter, the first electrode 561 is formed to cover the first reflection film 54, and the first electrode 561 and the second reflection film 55 are electrically connected at the same potential.

Accordingly, no charge is accumulated on the surfaces of the opposed first electrode 561 and second reflection film 55, and charging on both surfaces may be prevented. Thus, an extra force such as a repulsive force or an attractive force does not act between the first reflection film 54 and the second reflection film 55 and a reduction in the accuracy of controlling the distance between the reflection films due to charging may be suppressed.

Further, in the driving of the electrostatic actuator 56 in the etalon 5, the pull-in phenomenon that a pulling force sharply increases when the gap dimension between the first electrode 561 and the second electrode 562 becomes minute may be suppressed because the distance between the first electrode 561 and the second electrode 562 is larger than the distance between the first reflection film 54 and the second reflection film 55.

Accordingly, the first reflection film 54 and the second reflection film 55 do not contact or stick to each other, and the gap between the reflection films may be maintained.

Furthermore, the reflection film formation part 512 in which the first reflection film 54 is formed and the first electrode formation part 511 are connected via the slope 518. That is, no step is formed between the reflection film formation part 512 and the first electrode formation part 511. Accordingly, the first electrode 561 may be continuously formed and disconnection of the electrode film may be prevented.

In addition, the colorimetric sensor 3 as an optical filter module includes the etalon 5 that prevents charging of the opposed reflection films, and the accuracy of controlling the distance between the reflection films may be improved and the amount of light may be measured with high accuracy.

Further, the colorimetric instrument 1 as a photometric analyzer has the etalon 5 and the colorimetric sensor 3 including the light receiving unit 31, and thus, the amount of light may be measured with high accuracy. Accordingly, by performing photometric processing based on the measurement result, accurate spectroscopic characteristics may be obtained.

Next, modified examples of the etalon according to the embodiment will be explained.

Modified Examples

FIGS. 8 to 11 are sectional views showing modified examples of the configuration of the etalon. In the following explanations, the same configurations as those of the first embodiment have the same reference signs in the drawings and their duplicate explanation will be omitted.

Figure 8:
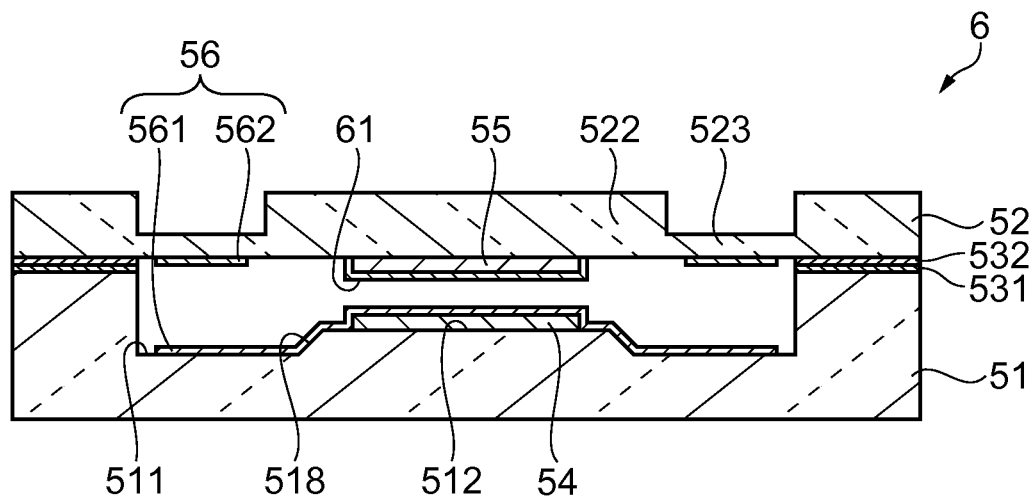
FIG. 8 is a sectional view showing a modified example in the first embodiment.

An etalon 6 shown in FIG. 8 is different from the etalon of the first embodiment in that a conducting film 61 covering the second reflection film 55 of the movable substrate 52 from the front surface to the side surfaces is provided.

The conducting film 61 is formed of a light-transmissive material, for example, an ITO film.

Because of this structure, no charge is generated on the surface of the conducting film 61 and no charge is generated at the side of the second reflection film 55. Accordingly, no attractive force or repulsive force acts between the reflection films, and the gap dimension between the reflection films may be accurately controlled by driving of the actuator. Further, the conducting film 61 is formed with a thickness of about 20 nm, and the conducting film 61 also has a function of acting as a protective film that protects the second reflection film 55.

Figure 9:
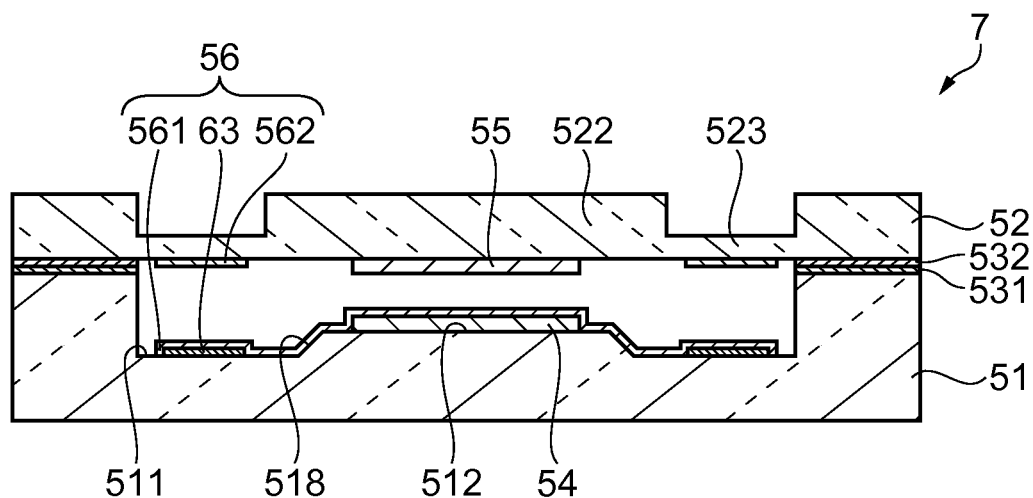
FIG. 9 is a sectional view showing a modified example in the first embodiment.

An etalon 7 shown in FIG. 9 is different from the etalon of the first embodiment in that an electrode 63 is formed in a location of the fixed substrate 51 facing the second electrode 562 and the first electrode 561 covering the electrode 63 and the first reflection film 54 is formed.

The electrode 63 is not limited to an ITO film, but may be a metal film such as a Cr/Au film. Here, the thickness of the electrode 63 is about 100 nm, the thickness of the first electrode 561 is about 20 nm, and the thickness of the second electrode 562 is about 100 nm.

According to the structure, for example, in the case where the first electrode 561 formed on the first reflection film 54 is not formed thicker due to optical properties, the parts that function as the electrostatic actuator 56 and other wiring parts may be made thicker and the electric resistance of the wiring may be reduced.

Figure 10:
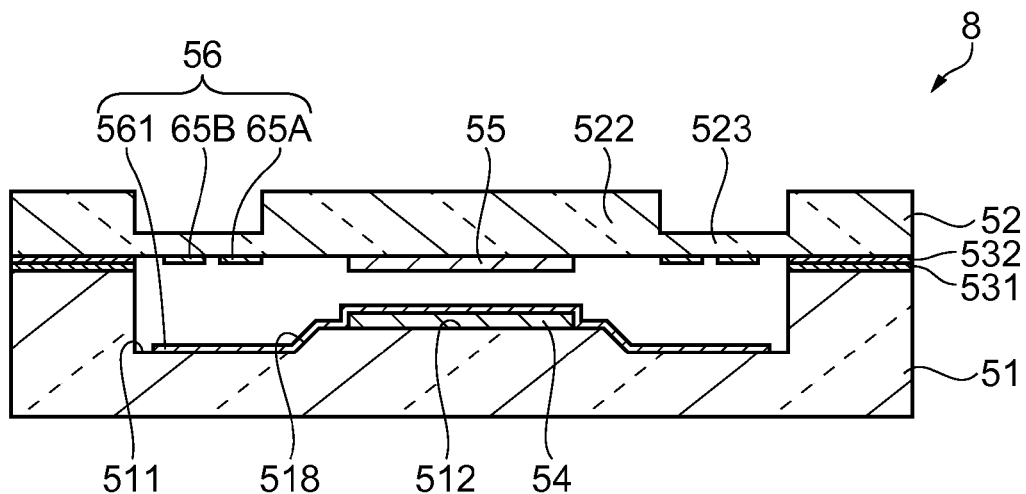
FIG. 10 is a sectional view showing a modified example in the first embodiment.

An etalon 8 shown in FIG. 10 is different from the etalon of the first embodiment in that the electrode of the electrostatic actuator 56 provided on the movable substrate 52 is formed by two electrodes 65A, 65B.

The electrodes 65A, 65B are formed in coaxial annular shapes and voltages are independently applied to them.

In the structure, the electrostatic force acting on the electrostatic actuator 56 may be finely adjusted and the gap dimension between reflection films may be controlled with high accuracy.

Note that, in FIG. 10, two electrodes have been exemplified, however, more electrodes may be employed.

Figure 11:
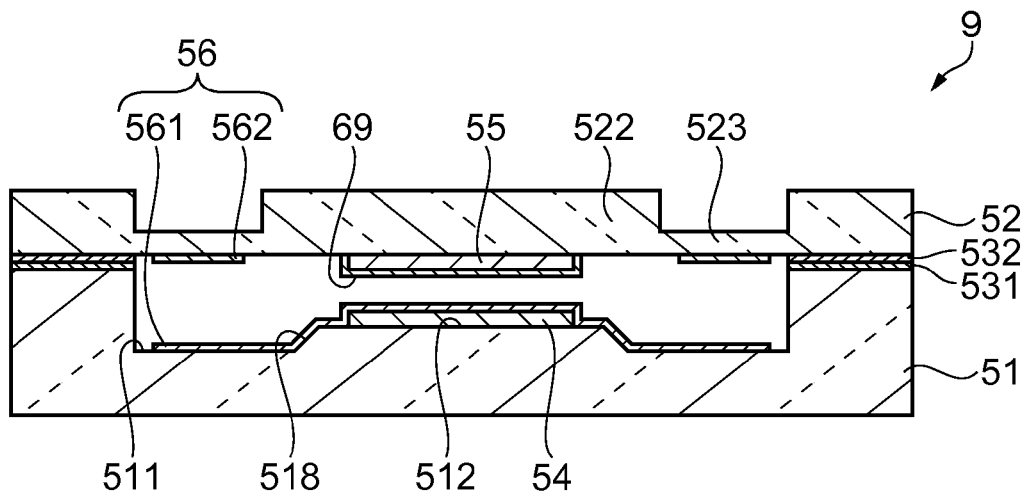
FIG. 11 is a sectional view showing a modified example in the first embodiment.

An etalon 9 shown in FIG. 11 is different from the etalon of the first embodiment in that an insulating film 69 covering the second reflection film 55 of the movable substrate 52 from the front surface to the side surfaces is provided.

The insulating film 69 is formed of a light-transmissive material, for example, an $Al_2O_3$ film, an $SiO_2$ film, or the like. Further, the first electrode 561 and the second reflection film 55 are connected to ground.

In the structure, even when the insulating film 69 is charged, the influence of the charged insulating film 69 is reduced because the first electrode 561 and the second reflection film 55 are grounded. Further, the thickness of the insulating film 69 is about 20 nm, for example, and deterioration of the second reflection film 55 due to the influence of gas, humidity, or the like may be prevented.

In the first embodiment, the colorimetric instrument 1 has been exemplified as a photometric analyzer, however, the optical filter, the optical filter module, and the photometric analyzer may be used in other various fields.

For example, they may be used as a light-based system for detection of the presence of a specific material. As the system, for example, a gas detector such as a vehicle-mounted gas leak detector that detects a specific gas with high sensitivity by employing a spectroscopic measurement method using the etalon (tunable interference filter) or a photoacoustic gas detector for a breath test may be exemplified.

Second Embodiment

Below, an example of the gas detector will be explained according to the drawings.

Figure 12:
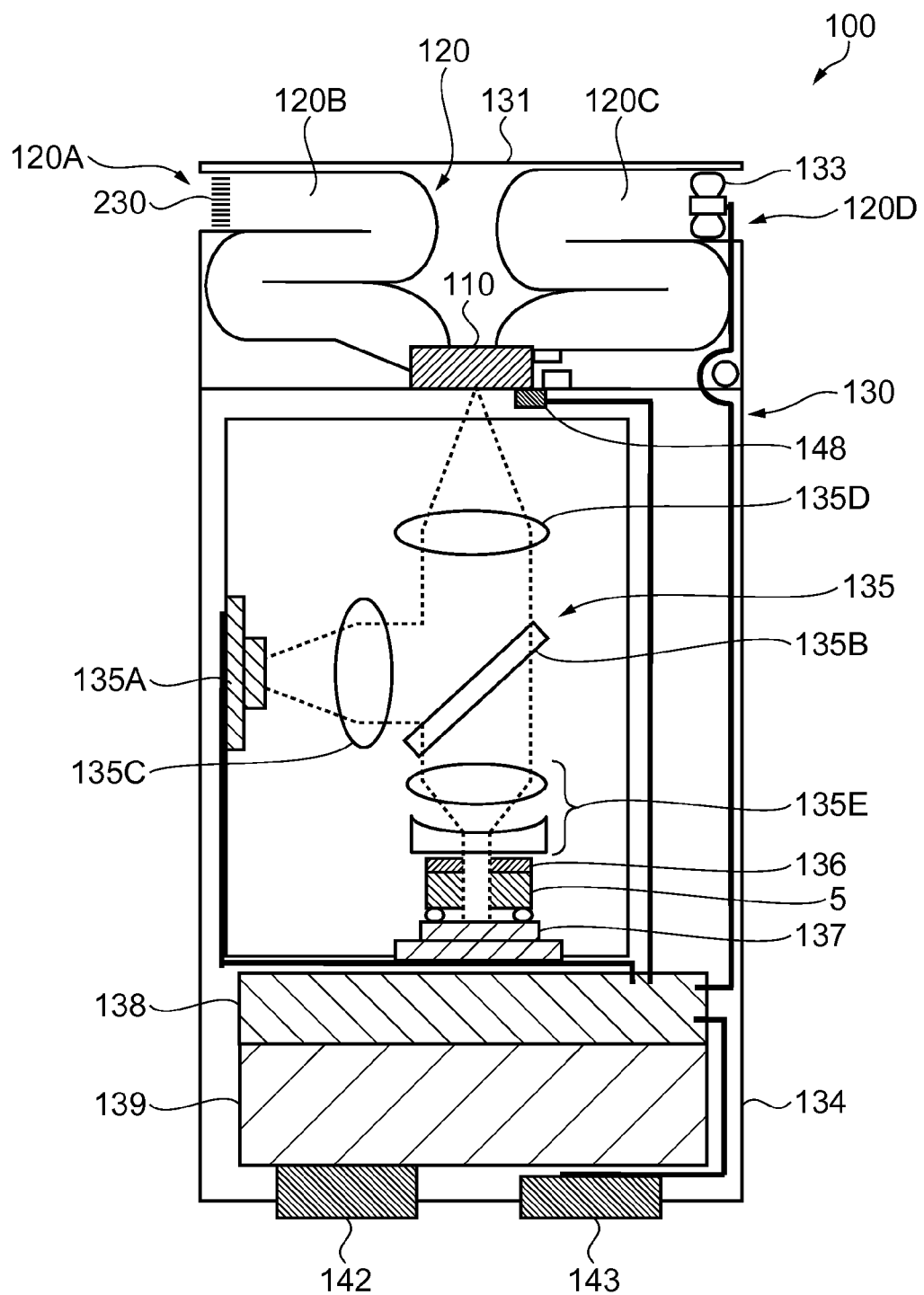
FIG. 12 is a sectional view showing a configuration of a gas detector as a photometric analyzer in the second embodiment.

FIG. 12 is a sectional view showing an example of the gas detector including the etalon.

Figure 13:
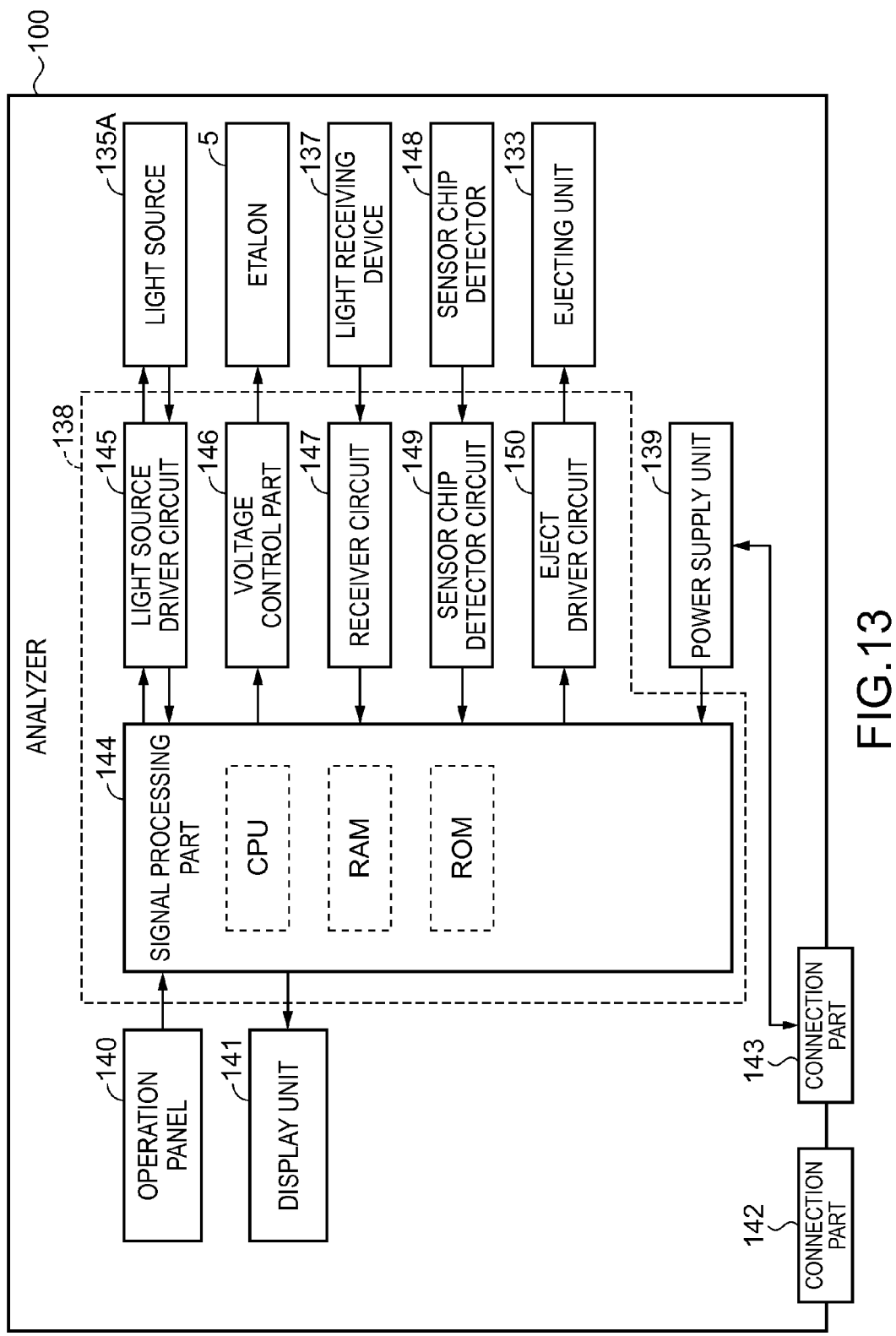
FIG. 13 is a circuit block diagram of the gas detector in the second embodiment.

FIG. 13 is a block diagram showing a configuration of a control system of the gas detector.

The gas detector 100 includes a sensor chip 110, a channel 120 having a suction port 120A, a suction channel 120B, an eject channel 120C, and an ejection port 120D, and a main body part 130 as shown in FIG. 12.

The main body part 130 includes a detection unit (optical filter module) including a sensor part cover 131 having an opening to which the channel 120 is detachably attached, an ejecting unit 133, a housing 134, an optical unit 135, a filter 136, the etalon (tunable interference filter) 5, a light receiving device 137 (light receiving unit), etc., a control unit 138 that processes a detected signal and controls the detection unit, and a power supply unit 139 that supplies power. Further, the optical unit 135 includes a light source 135A that outputs light, a beam splitter 135B that reflects the light entering from the light source 135A toward the sensor chip 110 side and transmits the light entering from the sensor chip side to the light receiving device 137 side, and lenses 135C, 135D, 135E.

Further, as shown in FIG. 13, in the gas detector 100, an operation panel 140, a display unit 141, a connection part 142 for interface with the outside, and the power supply unit 139 are provided. If the power supply unit 139 is a secondary cell, a connection part 143 for charging may be provided.

Furthermore, the control unit 138 of the gas detector 100 includes a signal processing part 144 having a CPU, a light source driver circuit 145 for control of the light source 135A, a voltage control part 146 for control of the etalon 5, a receiver circuit 147 that receives a signal from the light receiving device 137, a sensor chip detector circuit 149 that reads records of the sensor chip 110 and receives a signal from a sensor chip detector 148 that detects the presence or absence of the sensor chip 110, and an eject driver circuit 150 that controls the ejecting unit 133.

Next, an operation of the gas detector 100 will be explained.

Inside of the sensor part cover 131 in the upper part of the main body part 130, the sensor chip detector 148 is provided and the presence or absence of the sensor chip 110 is detected by the sensor chip detector 148. When the signal processing part 144 detects the detection signal from the sensor chip detector 148, the part determines that the sensor chip 110 has been mounted, and outputs a display signal to the display unit 141 for displaying that a detection operation can be performed.

Then, for example, if the operation panel 140 is operated by a user and an instruction signal of starting detection processing is output from the operation panel 140 to the signal processing part 144, first, the signal processing part 144 outputs a signal of light source activation to the light source driver circuit 145 and activates the light source 135A. When the light source 135A is driven, a stable laser beam of linearly-polarized light having a single waveform is output from the light source 135A. Further, a temperature sensor and a light amount sensor are contained in the light source 135A, and their information is output to the signal processing part 144. Then, if the signal processing part 144 determines that the light source 135A is in stable operation based on the temperature and the light amount input from the light source 135A, the part controls the eject driver circuit 150 to activate the ejecting unit 133. Thereby, a gas sample containing a target material (gas molecules) to be detected is guided from the suction port 120A into the suction channel 120B, the sensor chip 110, the eject channel 120C, and the ejection port 120D.

The sensor chip 110 is a sensor having plural metal nanostructures incorporated therein and uses localized surface plasmon resonance. In the sensor chip 110, when enhanced electric fields are formed between the metal nanostructures by the laser beam and the gas molecules enter the enhanced electric fields, Raman scattering light and Rayleigh scattering light containing information of molecule oscillation are generated.

The Rayleigh scattering light and Raman scattering light enter the filter 136 through the optical unit 135, the Rayleigh scattering light is separated by the filter 136, and the Raman scattering light enters the etalon 5. Then, the signal processing part 144 controls the voltage control part 146 to adjust the voltage applied to the etalon 5 and to allow the etalon 5 to spectroscopically separate the Raman scattering light in response to the gas molecules to be detected. Then, when the spectroscopically separated light is received by the light receiving device 137, the light reception signal in response to the amount of received light is output to the signal processing part 144 via the receiver circuit 147.

The signal processing part 144 compares spectrum data of the Raman scattering light in response to the gas molecules to be detected obtained in the above described manner and data stored in a ROM, determines whether or not they are the target gas molecules, and identifies the material. Further, the signal processing part 144 allows the display unit 141 to display the result information and outputs it to the outside from the connection part 142.

In FIGS. 12 and 13, the gas detector 100 that performs spectroscopic separation of the Raman scattering light using the etalon 5 and gas detection from the spectroscopically separated Raman scattering light has been exemplified, however, it may be used as a gas detector that identifies a gas type by detection of absorbance unique to the gas. In this case, a gas sensor that takes a gas inside and detects light absorbed by the gas of the incident light is preferably used as the optical filter module according to the invention. Further, a gas detector 100 that analyzes and discriminates the gas flowing into the sensor using the gas sensor may be the photometric analyzer according to the invention. The configuration may even detect components of the gas using the optical filter according to the invention.

Further, as a system for detection of the presence of a specific material, not limited to gas detection, but also a material component analyzer such as a non-invasive measurement device of sugar using near-infrared spectroscopy or a non-invasive measurement device of information of foods, living organisms, minerals, or the like may be exemplified.

Third Embodiment

Next, a food analyzer as an example of the material component analyzer will be explained.

Figure 14:
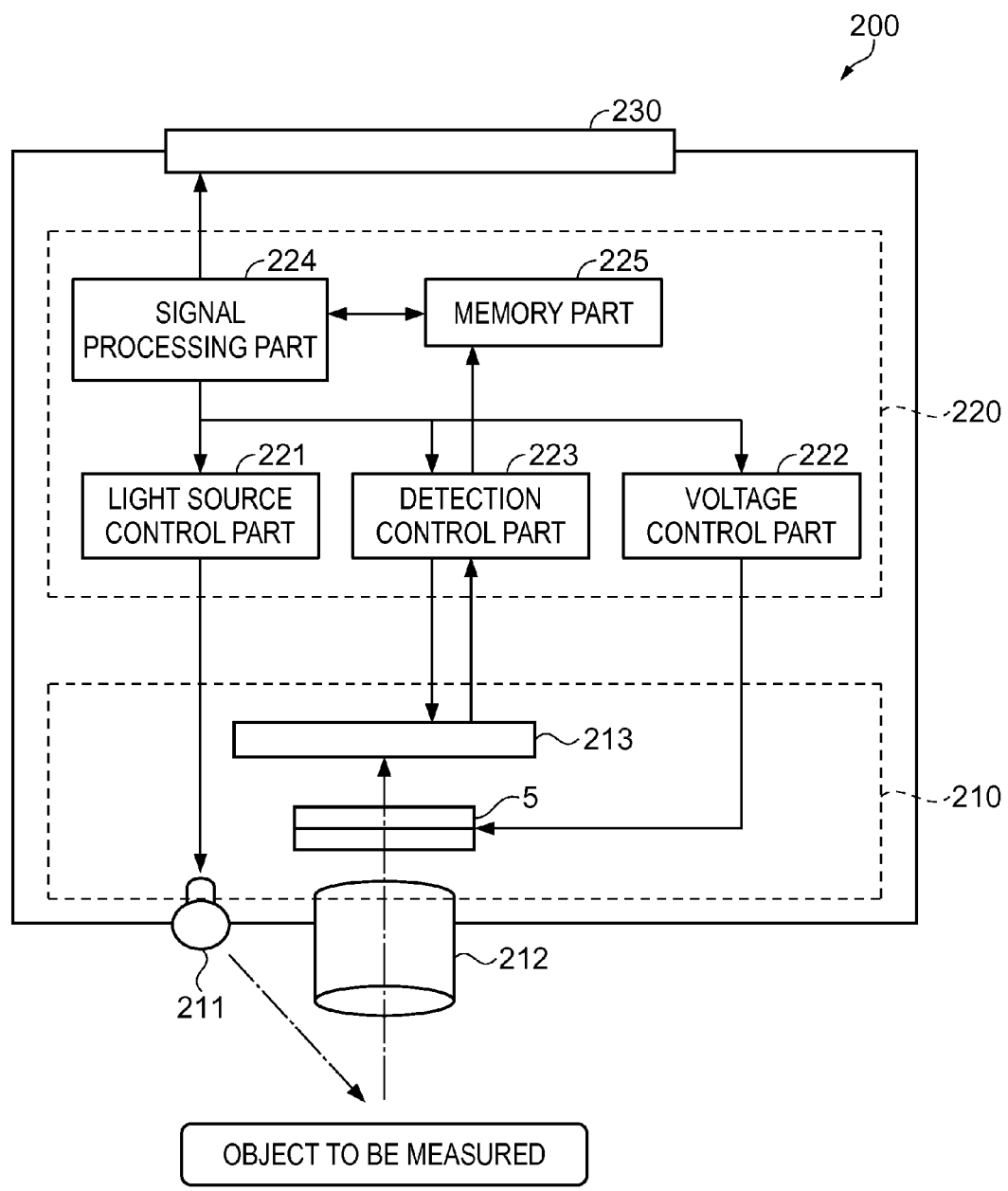
FIG. 14 is a block diagram showing a configuration of a food analyzer as a photometric analyzer in the third embodiment.

FIG. 14 is a block diagram showing a configuration of a food analyzer as an example of the photometric analyzer using the etalon 5.

The food analyzer 200 includes a detector (optical filter module) 210, a control unit 220, and a display unit 230. The detector 210 includes a light source 211 that outputs light, an imaging lens 212 that introduces light from an object to be measured, the etalon (tunable interference filter) 5 that spectroscopically separates the light introduced from the imaging lens 212, and an imaging unit 213 (light receiving unit) that detects the spectroscopically separated light.

Further, the control unit 220 includes a light source control part 221 that performs turn-on and turn-off control and brightness control when the light source 211 is turned on, a voltage control part 222 that controls the etalon 5, a detection control part 223 that controls the imaging unit 213 and acquires a spectroscopically separated image imaged by the imaging unit 213, a signal processing part 224, and a memory part 225.

In the food analyzer 200, when the device is driven, the light source 211 is controlled by the light source control part 221, and the object to be measured is irradiated with light from the light source 211. Then, the light reflected by the object to be measured passes through the imaging lens 212 and enters the etalon 5. A voltage that enables spectroscopic separation of a desired wavelength is applied to the etalon 5 under the control of the voltage control part 222, and the spectroscopically separated light is imaged in the imaging unit 213 including a CCD camera, for example. Further, the imaged light is accumulated as spectroscopically separated images in the memory part 225. Furthermore, the signal processing part 224 controls the voltage control part 222 to change the voltage value applied to the etalon 5, and acquires the spectroscopically separated images for the respective wavelengths.

Then, the signal processing part 224 performs computation processing on data of respective pixels in the respective images accumulated in the memory part 225, and obtains spectra in the respective pixels. Further, for example, information on components of foods with respect to the spectra is stored in the memory part 225. The signal processing part 224 analyzes the obtained spectrum data based on the information on the foods stored in the memory part 225, and obtains food components contained in the object to be detected and their contents. Further, from the obtained food components and contents, food calories, freshness, and the like may be calculated. Furthermore, by analysis of the spectrum distribution within the image, extraction of a part in which freshness has deteriorated in the food to be inspected or the like may be performed, and detection of foreign materials contained within the foods or the like may be performed.

Then, the signal processing part 224 performs processing of allowing the display unit 230 to display the information on the components, contents, calories, freshness, and the like of the food to be inspected obtained in the above described manner.

FIG. 14 shows an example of the food analyzer 200, however, a device having nearly the same configuration may be used as the above described non-invasive measurement device of other information. For example, the device may be used as a living organism analyzer that performs analysis of living organism components such as measurement, analysis, or the like of body fluid components of blood or the like. The living organism analyzer as a device for measurement of the body fluid components of blood or the like, for example, as a device for sensing ethyl alcohol, may be used as a drunk driving prevention device that detects the influence of alcohol of a driver. Further, the device may be used as an electronic endoscopic system including the living organism analyzer.

Furthermore, the device may be used as a mineral analyzer that performs component analyses of minerals.

In addition, the optical filter, the optical filter module, and the photometric analyzer according to the invention may be applied, at least, to the following devices.

For example, by changing the intensity of the light having respective wavelengths with time, data can be transmitted by the light having the respective wavelengths. In this case, light having a specific wavelength is spectroscopically separated by the etalon provided in the optical filter module and received by the light receiving unit, and thereby, the data transferred by the light having the specific wavelength may be extracted. Optical communications may be performed by processing the data of the light having respective wavelengths using the photometric analyzer having the optical filter module for data extraction.

Fourth Embodiment

Further, as another photometric analyzer, a configuration may be applied to a spectroscopic camera, a spectroscopic analyzer, or the like that image spectroscopically separated images by spectroscopic separation of light using the etalon (tunable interference filter) according to the invention. An example of a spectroscopic camera is an infrared camera containing the etalon.

Figure 15:
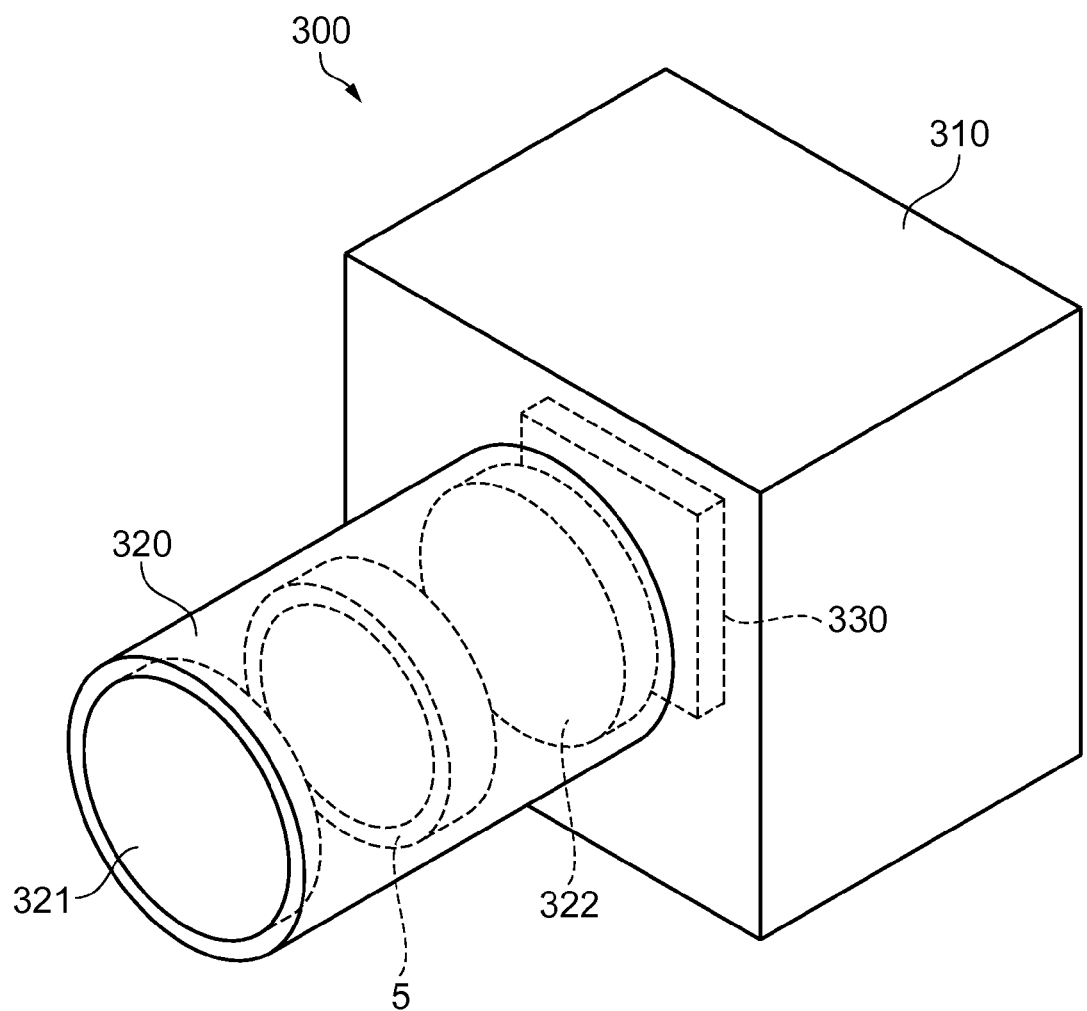
FIG. 15 is a perspective view showing a configuration of a spectroscopic camera as a photometric analyzer in the fourth embodiment.

FIG. 15 is a perspective view showing a configuration of a spectroscopic camera. As shown in FIG. 15, the spectroscopic camera 300 includes a camera main body 310, an imaging lens unit 320, and an imaging unit 330.

The camera main body 310 is a part to be grasped and operated by a user.

The imaging lens unit 320 is provided in the camera main body 310 and guides entering image light to the imaging unit 330. Further, the imaging lens unit 320 includes an objective lens 321, an image forming lens 322, and the etalon 5 provided between these lenses.

The imaging unit 330 includes a light receiving device and images the image light guided by the imaging lens unit 320.

In the spectroscopic camera 300, light having a wavelength to be imaged is transmitted through the etalon 5, and thereby, a spectroscopically separated image of light having a desired wavelength may be obtained.

Furthermore, the etalon according to the invention may be used as a bandpass filter, and, for example, may be used as an optical laser device that spectroscopically separates and transmits only light in a narrow band around a predetermined wavelength of the light in a predetermined wavelength range output by a light emitting device.

Further, the etalon according to the invention may be used as a biometric identification device, and, for example, may be applied to an identification device of blood vessels, finger prints, retina, iris, or the like using light in the near-infrared range and the visible range.

Furthermore, the optical filter module and the photometric analyzer may be used as a concentration detector. In this case, the concentration of an object to be inspected in a sample is measured by spectroscopic separation and analysis of infrared energy (infrared light) output from a material using the etalon.

As shown above, the optical filter, the optical filter module, and the photometric analyzer according to the invention may be applied to any device that spectroscopically separates a predetermined light from incident light. Further, as described above, the etalon according to the invention may spectroscopically separate plural wavelengths by one device, and thus, measurement of spectra of the plural wavelengths and detection of plural components may be performed with high accuracy. Therefore, as compared to the device in the past that extracts a desired wavelength using plural devices, downsizing of the optical filter module and the photometric analyzer may be promoted and the etalon may preferably be used as a portable or vehicle-mounted optical device, for example.

The invention is not limited to the embodiments that have been explained, and specific structures and procedures when the invention is implemented may be appropriately changed to other structures within a range in which the purpose of the invention may be achieved. Further, many modifications may be made by a person who has ordinary skill in the art within the scope of the invention.

The entire disclosure of Japanese Patent Application No. 2011-116643 filed May 25, 2011 is expressly incorporated by reference herein.

What is claimed is:

1. An optical filter comprising:
    a first reflection film;
    a second reflection film opposed to the first reflection film across a gap; and
    an electrode covering the first reflection film relative to the second reflection film and extending beyond an outer circumference of the first reflection film in a plan view of the first reflection film,
    wherein the electrode and the second reflection film are electrically connected.

2. An optical filter comprising:
    a first substrate;
    a second substrate opposed to the first substrate;
    a first reflection film on a surface of the first substrate facing the second substrate;
    a second reflection film on the second substrate and opposed to the first reflection film across a gap;
    a first electrode covering the first reflection film and extending beyond an outer circumference of the first reflection film in a plan view of the first substrate; and
    a second electrode on a surface of the second substrate facing the first substrate and opposed to a part of the first electrode,
    wherein the first electrode is formed of a light-transmissive material, and the first electrode and the second reflection film are electrically connected.

3. The optical filter according to claim 2, wherein a distance between the second electrode and the first electrode opposed to the second electrode is greater than a distance between the first reflection film and the second reflection film.

4. The optical filter according to claim 3, further comprising:
    a first reflection film formation part of the first substrate at which the first reflection film is formed;
    a first electrode formation part opposed to the second electrode at which the first electrode is formed;
    wherein the first reflection film formation part is located closer to the second substrate than the first electrode formation part, and
    the first reflection film formation part and the first electrode formation part are connected via a slope.

5. The optical filter according to claim 2, wherein a light-transmissive conducting film is on a surface of the second reflection film.

6. The optical filter according to claim 2, wherein a light-transmissive insulating film is formed on a surface of the second reflection film, and the first electrode is grounded.

7. An optical filter module comprising:
    a first substrate;
    a second substrate opposed to the first substrate;
    a first reflection film on a surface of the first substrate facing the second substrate;
    a second reflection film on the second substrate and opposed to the first reflection film across a gap;
    a first electrode covering the first reflection film and extending beyond an outer circumference of the first reflection film in a plan view of the first substrate;
    a second electrode on a surface of the second substrate facing the first substrate and opposed to a part of the first electrode; and
    a light receiving unit that receives light transmitted through at least one of the first reflection film and the second reflection film, wherein the first electrode is formed of a light-transmissive material, and the first electrode and the second reflection film are electrically connected.

8. A photometric analyzer comprising:
a first substrate;
a second substrate opposed to the first substrate;
a first reflection film on a surface of the first substrate facing the second substrate;
a second reflection film on the second substrate and opposed to the first reflection film across a gap;
a first electrode covering the first reflection film and extending beyond an outer circumference of the first reflection film in a plan view of the first substrate;
a second electrode on a surface of the second substrate facing the first substrate and opposed to a part of the first electrode;
a light receiving unit that receives light transmitted through at least one of the first reflection film and the second reflection film; and
an analytical processing unit that analyzes optical properties of the light based on the light received by the light receiving unit,
wherein the first electrode is formed of a light-transmissive material, and the first electrode and the second reflection film are electrically connected.

9. An optical filter comprising:
a first substrate having an annular depression surrounding a central protrusion;
a first reflection film on the central protrusion, an outer circumference of the first reflection film being within an outer circumference of the central protrusion;
a light-transmissive first electrode on the first reflection film and extending onto the annular depression;
a second substrate opposed to the first substrate;
a second reflection film on the second substrate and opposing the first reflection film across a gap; and
a second electrode on the second substrate and opposing a part of the first electrode on the annular depression,
wherein the first electrode and the second reflection film are electrically connected.

10. The optical filter according to claim 9, wherein
the second electrode is spaced apart from the first electrode by a first distance;
the first reflection film is spaced apart from the second reflection film by a second distance; and
the first distance is greater than the second distance.

11. The optical filter according to claim 9, wherein a transition between the annular depression and the central protrusion is sloped.

12. An optical filter comprising:
a first reflection film;
a light-transmissive first electrode on the first reflection film and extending beyond an outer circumference of the first reflection film;
a second reflection film opposing the first reflection film across a gap; and
a second electrode opposing a part of the first electrode extending beyond the outer circumference of the first reflection film,
wherein the first electrode and the second reflection film are electrically connected,
the second electrode is spaced apart from the first electrode by a first distance;
the first reflection film is spaced apart from the second reflection film by a second distance; and
the first distance is greater than the second distance.

* * * * *